Nov. 9, 1926.
A. W. GRAY
SEED POTATO CUTTER
Filed June 18. 1926     4 Sheets-Sheet 1
1,606,567
Fig. 1.
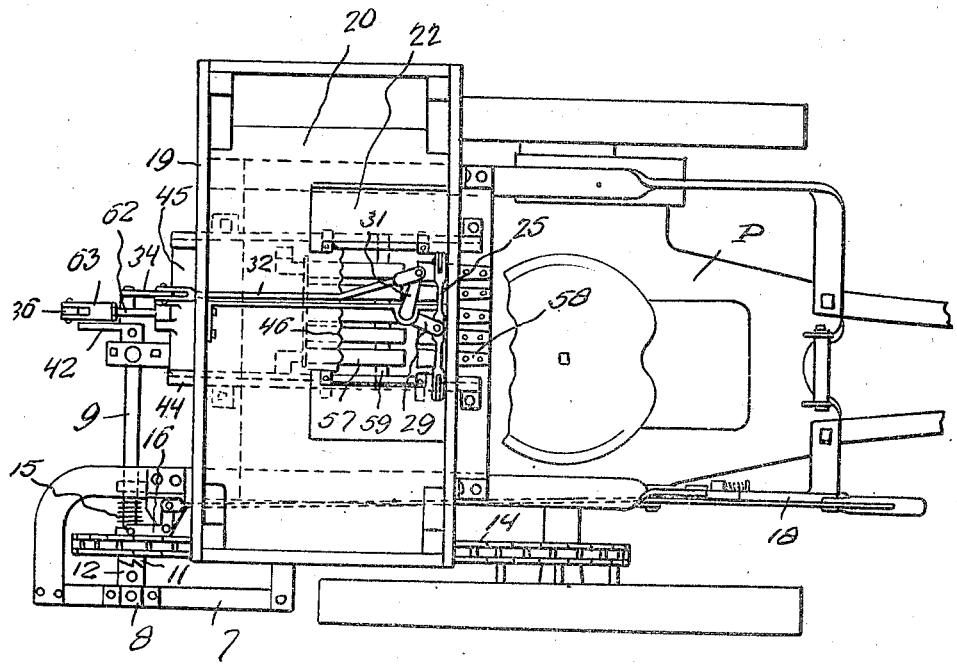
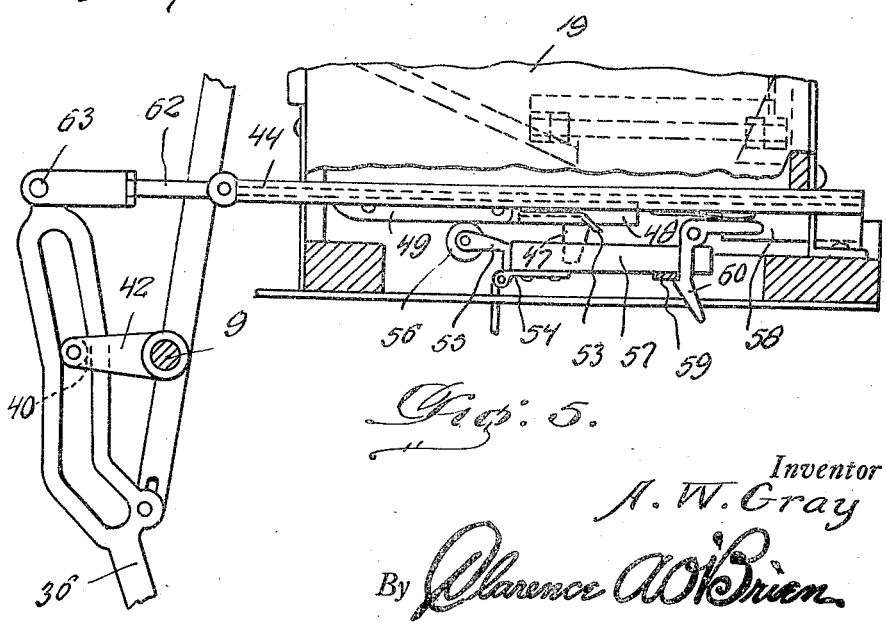
Fig. 5.
Inventor
A. W. Gray
By Clarence A. O'Brien
Attorney Nov. 9, 1926.

A. W. GRAY 1,606,567

SEED POTATO CUTTER

Filed June 18, 1926

Inventor
A. W. Gray,
By Clarence A. O'Brien
Attorney

Nov. 9, 1926.

A. W. GRAY 1,606,567

SEED POTATO CUTTER

Filed June 18, 1926      4 Sheets-Sheet 3

Inventor
A. W. Gray,

By Clarence A. O'Brien
Attorney

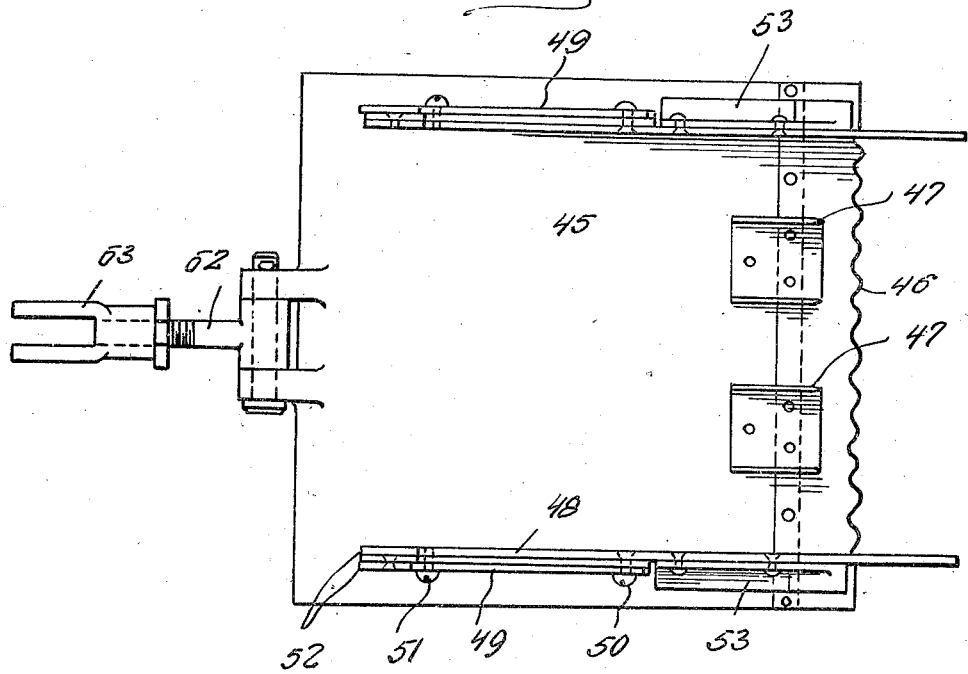
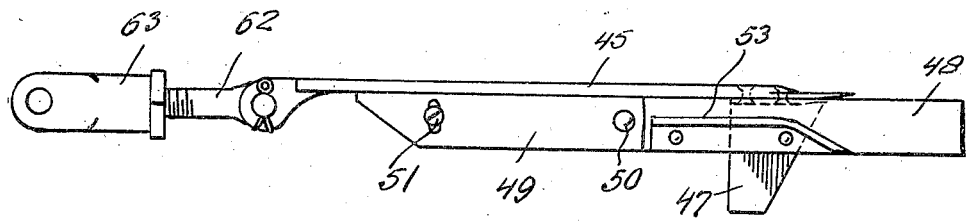

Patented Nov. 9, 1926.

1,606,567

UNITED STATES PATENT OFFICE.

ALBERT W. GRAY, OF ELDORA, IOWA.

SEED-POTATO CUTTER.

Application filed June 18, 1926. Serial No. 116,874.

The present invention relates to a seed potato cutter and is designed to be attached to a potato planter and has for its prime object to provide a device of this nature which is a practical labor saver.

Another important object of the invention is to provide an attachment of this nature provided with a hopper which the operator fills with whole seed potatoes and a cutting mechanism in the hopper which is operated from the potato planter and controllable from the seat thereof so that the potatoes may be cut into suitable sizes and dropped into the magazine of the planter from which the potato planter will plant them across the field as desired. If for any reason the cutter should feed the potatoes faster than the planter can use them, the driver releases a clutch which is provided and the cutter ceases to operate. When more potatoes are needed in the planter, the clutch is put in gear by means of a lever at the side of the driver, and then the cutter will operate as before.

The structure is such that these changes may all be made by the driver while the planter is in operation.

Another important object of the invention lies in the provision of a cutter attachment of this nature which is exceedingly simple in its construction, compact, convenient, and easy to manipulate, thoroughly reliable and efficient in operation, will not easily become out of order, and otherwise well adapted to the purposes for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 1 is a top plan view of my attachment, showing the same associated with a planter, Fig. 2 is a side elevation thereof, Figs. 3 and 4 are detail sections through the hopper, taken substantially on the lines 3—3 and 4—4 respectively of Fig. 2, Fig. 5 is an enlarged detail sectional elevation, showing particularly the bottom portion of the hopper with the operating mechanism for the cutter.

Fig. 6 is a bottom plan view of the cutter,

Fig. 7 is a side elevation thereof, and

Figure 2:
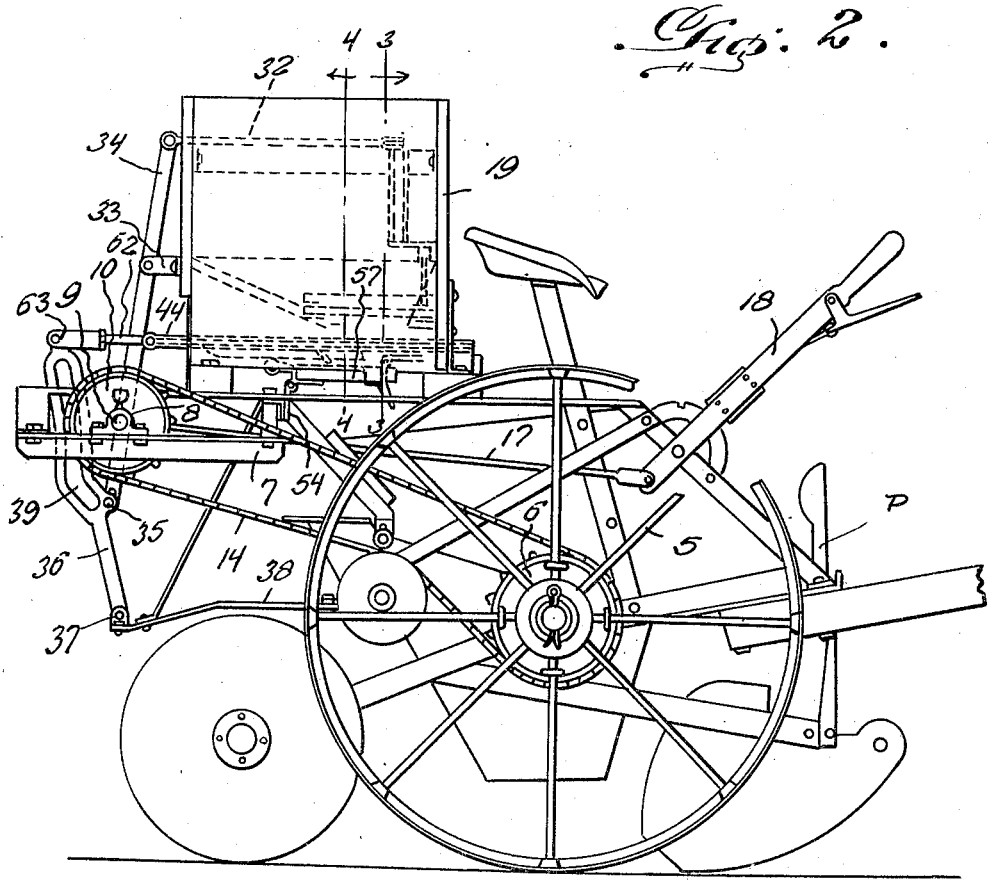

Referring to the drawing in detail, it will be seen that I have illustrated a conventional form of a planter, indicated generally by the letter P, including among other elements, a pair of wheels 5 on one of which is clamped a sprocket 6. A frame structure 7 is mounted in any suitable manner on the planter P and supports bearings 8 in which is journaled the main operating shaft 9 of the attachment. Sprocket 10 is rotatably mounted on the shaft 9 and is provided with a clutch segment 11 adapted to engage with a clutch segment 12 fixed on the shaft 9. A chain 14 is trained over the sprockets 6 and 10 so the sprocket 10 is in operation as the planter P moves along.

A spring 15 on the shaft 9 normally holds the sprocket 10 so that its clutch segment 11 is engaged with the clutch segment 12. A bell crank 16 is associated with the sprocket 10 for shifting the same to engage and disengage the clutch elements 11 and 12. This bell crank 16 is operated through the intermediacy of a rod 17 and a lever 18 conveniently located with respect to the seat of the planter.

The numeral 19 denotes a hopper adapted to receive whole seed potatoes. The bottoms 20 of the hopper 19 are slanted inwardly and downwardly and have openings 21 in which are swingably mounted agitator plates 22 carried on shafts 23 journaled in the hopper. Cranks 24 are joined to the shafts 23 and are connected to each other by a link 25. A bearing 26 is mounted on a bracket 27 in the hopper 19 and suitably supports a vertical shaft 28 having a crank 29 at its bottom end engaged with an intermediate portion of the link 25 as at 30 and a crank 31 at its upper end engaged with a connecting rod 32.

A bracket 33 is mounted exteriorly of the rear side of the hopper 19 and rockably supports a lever or walking beam 34, the upper end of which is joined with the connecting rod 32 while the lower end thereof is connected by a pin and slot connection 35 to a lever 36 pivoted at its lower end as at 37 and an extension 38 attached to the planter. The upper end of this lever 36 is provided with a cam slot 39 in which operates a roller 40 and a crank 42 extending from shaft 9 so that the rotation of the shaft 9 imparts oscillatory movement to the lever 36 which in turn imparts oscillatory movement to the beam 34 which reciprocates the rod 32, thereby rocking the agitators 32 by the mechanism previously described.

A pair of channel guides 44 extending through the bottom of the hopper longitudinally of the planter and below the space between the agitator plates 22. The cutter body plate 45 has its side edges slidably mounted in the guide 44 and has a corrugated forward cutting edge 46 and a plurality of depending vertical cutters 47 arranged in pairs, each pair forming a substantially inverted U-shaped construction. A pair of bars 48 are mounted on the bottom surface of the body 45 one adjacent each side edge thereof.

Figure 8:
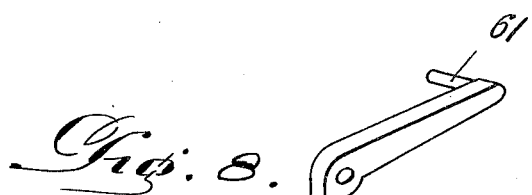
Fig. 8 is a perspective view of one of the catches.
Figure 3:
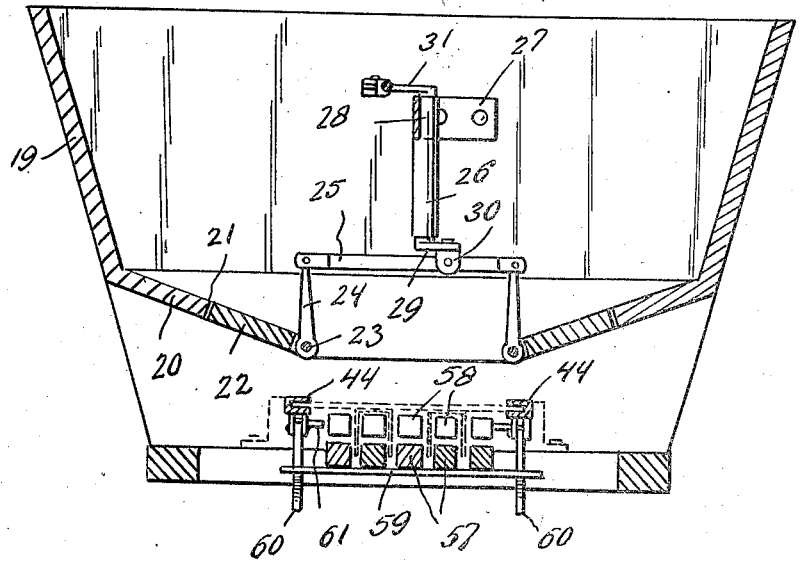
Figure 4:
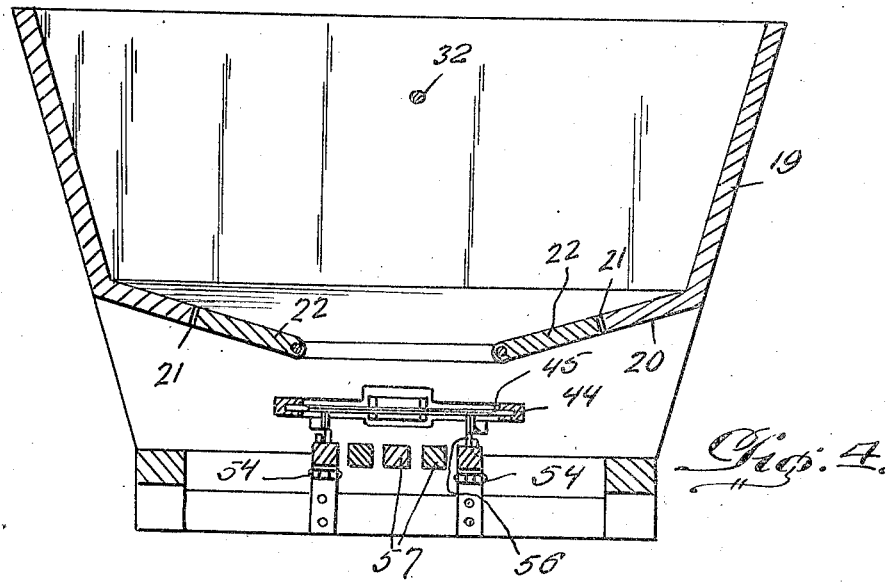

Cam bars 49 are pivoted to the bars 48 as at 50 and have pin and slot connections to 48 as at 51. The rear ends of the bars 48 and 49 are beveled as is indicated at 52. A cam member 53 is mounted on the forward portion of each bar 48. Below the body plate 45 there is pivotally mounted in the hopper, brackets 54 having arms 55 projecting therefrom in the extremities of which are journaled rollers 56 for engaging cam bars 49. The brackets 54 support slat bars 57 which extend in spaced parallelism and receive the vertical cutters 47 therebetween, as is more clearly shown in Fig. 3. Stop bars 58 project inwardly of the hopper and terminate immediately above the forward ends of the slat bars 57. A cross member 59 is attached to the portion of the slat bars 57 for engagement by pivoted attachments 60, the forward ends of which are provided with lateral pins 61, see Fig. 8, which are engageable by the cams 53.

A link 62 is pivotally engaged with the rear end of the straight body 45 and is joined as at 63 with the upper extremity of the lever 36. As this lever 36 oscillates, it will be seen that reciprocatory motion is imparted to the cutter body 45 for severing the potatoes both vertically and horizontally through the cutting edge 46 and the vertical cutters 47. As the cutter moves to its forwardmost position, the rollers 56 will ride up the beveled ends of the cam bars 49 so as to allow the slat bars 57 to swing downwardly because they will be released since the cams 53 will engage the pin 61 to swing the catches 60 to disengaging positions. As the cutter moves rearwardly, the cam bars 49 will swing the slat bars 57 back to their normal position and at the same time the cams 53 will be freed from the pins 61 so that the catches will swing back to their normal engaging position with the cross member 59.

When the slat bars 57 are dumped as indicated, the severed potatoes will be allowed to drop down into the magazine of the potato planter. It is apparent that if the seed potato cutter is operated to furnish the seed potatoes too quickly to the magazine of the hopper, that the operator may place the attachment in inoperative position by manipulation of the lever 18 as heretofore indicated. The lever 18 may be operated while the potato planter is in operation, it not being necessary to stop the same.

It is thought that the construction, operation, and advantages of this device will now be apparent to those skilled in this art without a more detailed description thereof. The present embodiment of the invention has been disclosed in detail merely by way of example since in actual practice it has attained the features of advantage enumerated as desirable in the statement of the invention and the above description. Numerous changes in the details of construction, and in the combination and arrangement of parts may be resorted to without departing from the spirit or scope of the invention as hereinafter claimed, or sacrificing any of its advantages.

Having thus described my invention, what I claim as new is:

1. In a device of the class described, a hopper, a frame, a shaft journaled on the frame, means for rotating the shaft, a pivotally mounted lever having a slot at its upper end, a crank extending from the shaft, a roller on the end of the crank movable in the cam slot, for imparting oscillatory motion to the lever, a beam pivotally mounted intermediate its ends on the hopper and having its lower end pivotally engaged with an intermediate portion of the lever to be oscillated thereby, means in the hopper, means for operatively connecting the cutting means with the upper end of the lever, agitating means in the hopper, and means for connecting the agitating means with the upper end of the beam.

2. A device of the class described, a hopper, a frame, a shaft journaled on the frame, means for rotating the shaft, a pivotally mounted lever having a slot at its upper end, a crank extending from the shaft, a roller on the end of the crank movable in the cam slot, for imparting oscillatory motion to the lever, a beam pivotally mounted intermediate its ends on the hopper and having its lower end pivotally engaged with an intermediate portion of the lever to be oscillated thereby, means in the hopper, means for operatively connecting the cutting means with the upper end of the lever, agitating means in the hopper, means for connecting the agitating means with the upper end of the beam. a pivotally mounted bracket in the bottom of the hopper, a plurality of slat bars projecting from the brackets, and means operable by the cutting means for causing the slat bars to dump and return at intervals to normal positions.

3. In a device of the class described, a hopper, a pair of agitating plates rockably mounted in the bottom of the hopper, cranks extending from the plates, a link connecting the cranks, a vertical bearing in the hopper, a shaft rockable in the vertical bearing and having a crank at its lower end engaged with the link, a crank at its upper end, means for imparting oscillations to the upper crank, cutter means mounted in the hopper below the agitating plate, and means for operating said cutting means simultaneously with the cutting plate.

4. In combination, a hopper, a pair of channel guides in the guide, a plate body slidable in the channel guides and having its forward end provided with a corrugated cutter, vertical depending cutters extending from the plate body, and means for imparting rectilinear motion to the plate.

5. In combination, a hopper, a pair of channel guides in the guide, a plate body slidable in the channel guides and having its forward end provided with a corrugated cutter, vertical depending cutters extending from the plate body, means for imparting rectilinear motion to the plate, a bracket pivoted in the hopper, a plurality of slats projecting from the bracket in which the depending cutters move, arms extending from the bracket, rollers journalled in the arms, cams on the plate body for engaging the rollers so that when the knife is in the forwardmost position, said slats are dumped downwardly and when the knife is in other positions, said slats are in a horizontal position.

6. In combination, a hopper, a pair of channel guides in the guide, a plate body slidable in the channel guides and having its forward end provided with a corrugated cutter, vertical depending cutters extending from the plate body, means for imparting rectilinear motion to the plate, a bracket pivoted in the hopper, a plurality of slats projecting from the bracket in which the depending cutters move, arms extending from the bracket, rollers journalled in the arms, cams on the plate body for engaging the rollers so that when the knife is in the forwardmost position, said slats are dumped downwardly and when the knife is in the other positions, said slats are in a horizontal position, a cross member on the free ends of the slots, pivoted catches in the hopper for engaging the cross member, and a cam on the plate body for engaging the same and releasing them at the proper time.

7. In combination, a hopper, a pair of channel guides in the guide, a plate body slidable in the channel guides and having its forward end provided with a corrugated cutter, vertical depending cutters extending from the plate body, means for imparting rectilinear motion to the plate, a bracket pivoted in the hopper, a plurality of slats projecting from the bracket in which the depending cutters move, arms extending from the bracket, rollers journalled in the arms, cams on the plate body for engaging the rollers so that when the knife is in the forwardmost position, said slats are dumped downwardly and when the knife is in the other positions, said slats are in a horizontal position, a cross member on the free ends of the slots, pivoted catches in the hopper for engaging the cross member, a cam on the plate body for engaging the same and releasing them at the proper time, said means for imparting rectilinear motion to the body being in the form of an oscillating lever having its upper end provided with a slot which is curved, a shaft, a crank extending from the operating shaft and having a roller thereon for engaging in the curved slot.

8. In combination, a hopper, a pair of channel guides in the guide, a plate body slidable in the channel guides and having its forward end provided with a corrugated cutter, vertical depending cutters extending from the plate body, means for imparting rectilinear motion to the plate, a bracket pivoted in the hopper, a plurality of slats projecting from the bracket in which the depending cutters move, arms extending from the bracket, rollers journaled in the arms, cams on the plate body for engaging the rollers so that when the knife is in the forwardmost position, said slats are dumped downwardly and when the knife is in the other positions, said slats are in a horizontal position, a cross member on the free ends of the slots, pivoted catches in the hopper for engaging the cross member, a cam on the plate body for engaging the same and releasing them at the proper time, said means for imparting rectilinear motion to the body being in the form of an oscillating lever having its upper end provided with a slot which is curved, a shaft, a crank extending from the operating shaft and having a roller thereon for engaging in the curved slot, an oscillatory beam mounted on the hopper, the lower end of the beam having a pin and slot engagement with the lever, agitators in the hopper, operable by the beam.

In testimony whereof I affix my signature.

ALBERT W. GRAY.